United States Patent [19]

Southworth et al.

[11] 3,950,607

[45] Apr. 13, 1976

[54] BANDWIDTH COMPRESSION SYSTEM AND METHOD

[75] Inventors: Glen R. Southworth, Boulder; Roy W. Lewallen, Denver; John E. Sparks, Boulder, all of Colo.

[73] Assignee: Colorado Video, Inc., Boulder, Colo.

[22] Filed: Apr. 30, 1973

[21] Appl. No.: 355,802

[52] U.S. Cl. ............... 178/6; 178/6.8; 178/DIG. 3; 178/DIG. 24; 179/2 TV
[51] Int. Cl.$^2$ .......................................... H04N 7/12
[58] Field of Search ....... 178/DIG. 3, DIG. 4, 15.55, 178/6.8, DIG. 24; 179/2 TV

[56] References Cited
UNITED STATES PATENTS

| | | | |
|---|---|---|---|
| 3,499,996 | 3/1970 | Klayman et al. | 179/15.55 |
| 3,683,111 | 8/1972 | Southworth | 178/6 |
| 3,736,373 | 5/1973 | Pease | 178/6 |
| 3,752,912 | 8/1973 | Ohsawa et al. | 178/6 |
| 3,806,644 | 4/1974 | Browne et al. | 178/6.8 |
| 3,825,677 | 7/1974 | Kasprzak | 178/6.8 |

*Primary Examiner*—Howard W. Britton
*Assistant Examiner*—Edward L. Coles

[57] ABSTRACT

A method and apparatus is disclosed for converting a wide-bandwidth signal to a narrow-bandwidth signal, the disclosed method and apparatus being particularly well suited for converting a wide-bandwidth real-time television signal to a narrow-bandwidth signal. A sampled video signal is coupled to an analog-to-digital converter which converts the amplitude of each sampled element to a binary code word having a predetermined number of bits. The binary code words are then written into a buffer storage element controlled by a clock switching device and later clocked out of the buffer storage device at a clock rate less than the input rate with the output from the buffer storage device being coupled to a digital-to-analog converter whose output is an analog signal with the same amplitude variations as the sampled video signal but with a time base stretched out by a predetermined factor. The field, either odd or even interlace, from which the sampled video signal was taken is identified by ascertaining the location of the horizontal signal pulses relative to the vertical signal pulse, and this field index may then be used to code the output narrow-bandwidth video signal. Another embodiment is disclosed which utilizes an analog shift register as the buffer storage device in place of the digital buffer storage with its attached analog-to-digital and digital-to-analog converter. An alternate embodiment is disclosed which utilizes a pair of parallel connected buffer storage units (either digital or analog) controlled by output gating to provide for a continuous non-interlaced narrow-bandwidth signal.

29 Claims, 11 Drawing Figures

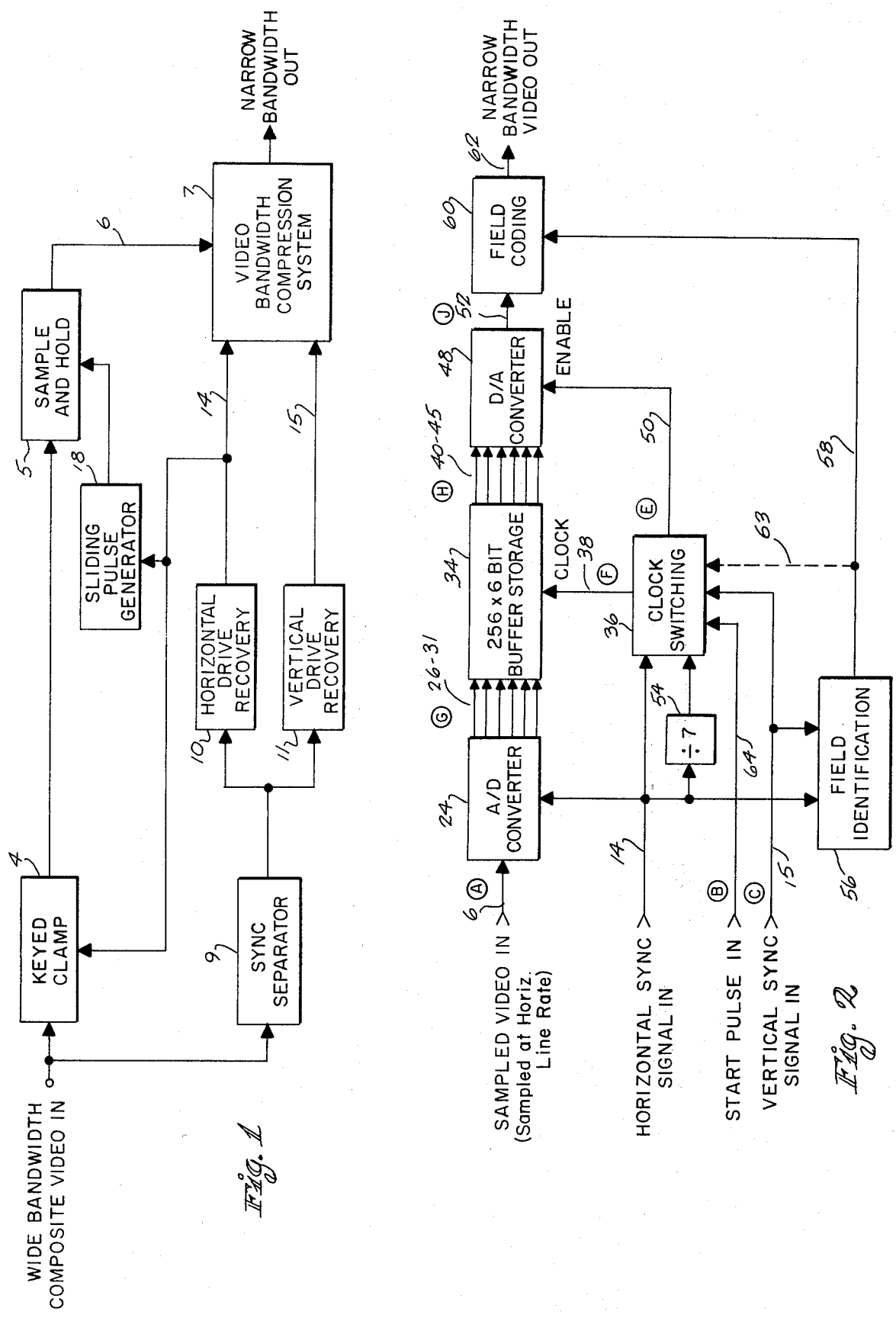

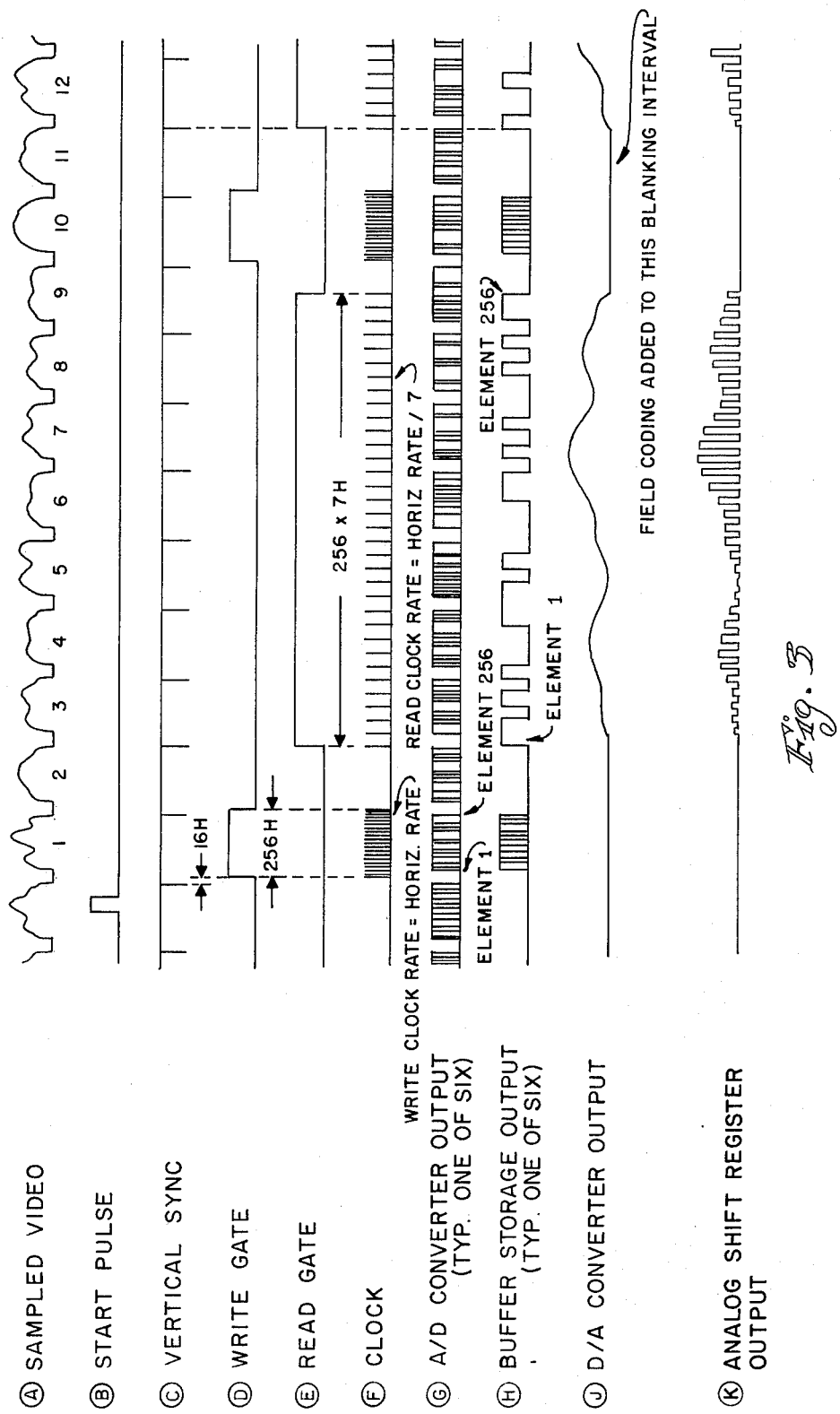

BANDWIDTH COMPRESSION SYSTEM AND METHOD

BACKGROUND OF THE INVENTION

1. Field of the Invention

This invention relates to a bandwidth compression system and method and more particularly relates to a bandwidth compression system and method for converting a video signal into a narrow-bandwidth signal suitable for transmission.

2. Description of the Prior Art

It is often times desirable that a wide bandwidth signal be converted to a narrow bandwidth signal so that the resulting signal can be more easily handled such as, for example, in signal transmission. While such a signal might be transmitted over wide bandwidth lines, this has been found to be undesirable since such transmission is expensive. It has therefore been found desirable to convert wide bandwidth video signals, such as real-time television signals, for example, to narrow bandwidth signals so that the necessary information can be transmitted over less expensive transmission lines, such as telephone circuits, for example, as compared with coaxial cables, microwave systems and the like which are required for wide bandwidth transmission.

It has been found heretofore that narrow bandwidth video signals can be generated using special cameras or scanning devices having very slow line rates and frame rates. Known apparatus and methods utilizing these techniques, however, have not been found to be completely satisfactory, at least for some purposes and at least some such known devices have had undesirable limitations from an operational standpoint, including problems relating to equipment availability, monitoring equipment and techniques, stability, and signal-to-noise ratios.

A different approach to the generation of narrow-bandwidth video signals has employed sampling techniques wherein pictorial information signals are generated in the camera or scanning device running at real-time rates and the bandwidth reduced by sampling the video signal at a much lower rate. Such a technique has been described, for example, by Altes and Reed in an article entitled "Slow-Scan Adapter for Conventional TV Signals" in the June 1, 1957 issue of Electronics Magazine. In addition, such techniques are also described in U.S. Pat. No. 2,955,159 issued to C. E. Jones, Jr., and entitled "NARROW BAND VIDEO COMMUNICATION SYSTEM", U.S. Pat. No. 3,284,567 issued to Glen R. Southworth and entitled "NARROW BANDWIDTH TELEVISION SYSTEM" and U.S. Pat. No. 3,683,111 issued to Glen R. Southworth and entitled "TELEVISION BANDWIDTH COMPRESSION AND EXPANSION SYSTEM".

While apparatus and methods utilizing sampling techniques have proved to be useful at least for some applications, it has been found that at least some such systems and methods have not proved to be completely satisfactory for all intended purposes and have, for example, been found to: require camera modification; be restricted to an output data rate that is the same as the sampling rate; require a dot-interlaced sampling in order to obtain bandwidth compression to telephone circuit bandwidths which in turn creates a problem of non-compatability with other existing reproducing systems, requires special synchronizing circuitry at the receiver, and is subject to inter-symbol interference which when caused by transmission circuits results in multiple "ghosting"; and/or have an inability to provide a non-interlaced continuous bandwidth output signal while utilizing the information from both fields of an interlaced input signal.

SUMMARY OF THE INVENTION

This invention provides an improved device and method utilizing sampling techniques to produce a narrow bandwidth signal suitable for transmission by relatively inexpensive transmission lines, which device and method overcomes limitations and problems heretofore present as set forth hereinabove. The input signal is coupled to a converter means which produces an output in digital form that is indicative of at least portions of the signal received at the input means, the output from this converter means being coupled to storage means, and the output from the storage means being coupled to another converter means which produces an output signal in analog from that is substantially the same as the received signal but has a relatively narrow bandwidth with respect to that of the received signal.

It is therefore an object of this invention to provide an improved bandwidth compression system.

It is another object of this invention to provide an improved bandwidth compression system that utilizes a sampling technique to convert the input signal to digital form and then back to an analog form with the resultant signal having substantially the same signal characteristics as the received signal but having a relatively narrow bandwidth with respect thereto.

It is still another object of this invention to provide an improved bandwidth compression system that is suitable for converting a video signal to a narrow bandwidth signal for transmission purposes.

It is yet another object of this invention to provide a bandwidth compression system which includes an analog-to-digital converter, a buffer storage means, a digital-to-analog converter and clock switching means for causing the sampled amplitude of a signal received from the input means to be converted to a digital signal for storage and for controlling conversion of the digital signal back into an analog signal of narrow bandwidth relative to an input signal.

It is yet another object of this invention to provide an improved method for converting a wide-bandwidth signal into a narrow bandwidth signal.

It is still another object of this invention to provide an improved method for converting a wide-bandwidth signal into a narrow bandwidth signal utilizing conversion first to digital form and then reconversion to analog form.

It is yet another object of this invention to provide a bandwidth compression system utilizing a pair of parallel buffer storage units (either digital or analog) controlled by output gating to provide for a continuous non-interlaced narow-bandwidth signal.

It is another object of this invention to provide a bandwidth compression system utilizing an analog shift register as a buffer storage means.

With these and other objects in view which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment and an alternate embodiment of the invention according to the best mode so far devised for the practical application of the principles thereof, and in which:

FIG. 1 is a block diagram of a system for producing a narrow bandwidth output, which system utilizes the bandwidth compression system of this invention;

FIG. 2 is a block diagram of one embodiment of the bandwidth compression system of this invention;

FIG. 3 A–J shows a plurality of typical wave forms to illustrate the time relationship established for the various signals of the system shown in FIG. 2 while FIG. 3K illustrates the analog shift register output at Ⓚ in FIG. 10 it being understood that said output at Ⓚ is in the same time relationship for the waveforms in FIG. 3A–3J;

DESCRIPTION OF THE PREFERRED AND ALTERNATE EMBODIMENTS

Figure 4:
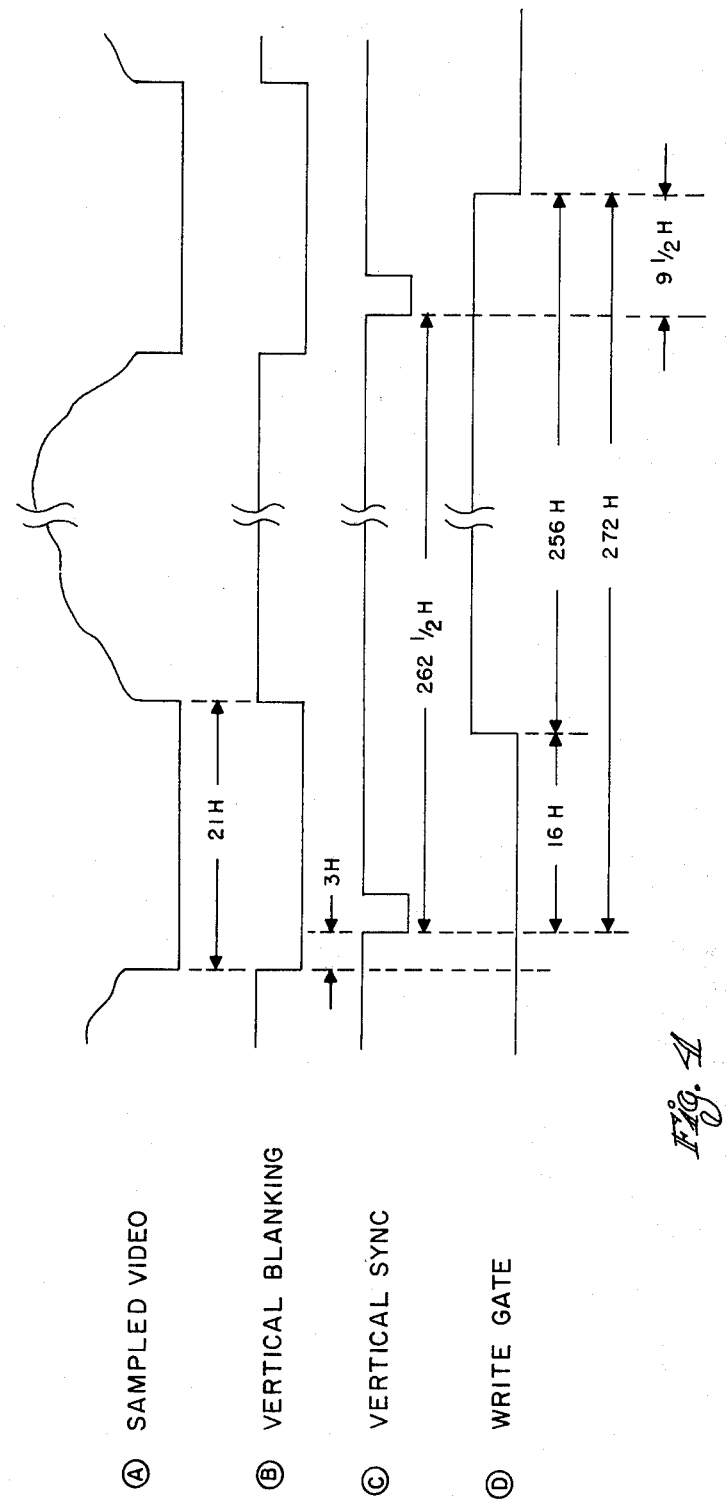
FIG. 4 shows a plurality of typical wave forms illustrating in greater detail portions of the wave forms shown in FIG. 3.

Referring now to the drawings in which like numerals have been used for like characters, the overall compression device is shown in FIG. 1, in simplified form. A wide bandwidth video input signal, from a conventional video source such as a TV camera, for example, (not shown) is coupled through a keyed clamp 4 to a sample and hold circuit 5. The output from the sample and hold circuit 5 provides a sampled video output that is coupled by lead 6 to the video bandwidth compression system 7 of this invention. As also shown in FIG. 1, the composite video input signal is also coupled to sync separator 9, the output of which is coupled to horizontal drive recovery 10 and to vertical drive recovery 11, both of which provide an output to video bandwidth compression system 7 through leads 14 and 15. In addition, the output from horizontal drive recovery 10 is also coupled to keyed clamp 4, and to sliding pulse generator 18. This circuitry thus provides to the video bandwidth compression system three inputs, namely, a sampled video input (from sample and hold 5 through lead 6), a horizontal sync input (from horizontal drive recovery 10 through lead 14), and a vertical sync input from vertical drive recovery 11 through lead 15). The circuitry providing these inputs is shown and described in greater detail in U.S. Pat. No. 3,683,111 issued Aug. 8, 1972 to Glen R. Southworth and entitled "TELEVISION BANDWIDTH COMPRESSION AND EXPANSION SYSTEM", and may be referred to for further details of said circuitry, as well as circuitry for video expanders as shown and described therein and which may be utilized with this invention to recover the video information after transmission.

Known sampling techniques in their simplest form, without dot-interlace, provide a bandwidth compression to about 8 kHz for both the American 525 line TV system and the European 625 line TV system. The system of this invention is designed to provide further compression to a bandwidth of approximately 1 kHz and thus be compatible with less expensive types of transmission lines such as, for example, conventional telephone lines. It is to be realized, however, that this invention is not meant to be limited to reduction to a bandwidth of 1 kHz since the compression system of this invention can be utilized for signal compression to other bandwidths.

Referring now to FIG. 2, it can be seen that the sampled video input signal is coupled to analog-to-digital converter 24 through lead 6. As shown in FIG. 3A, the sampled video signal normally includes a plurality of sampled video outputs (numbered 1 through 12 in FIG. 3A). In the analog-to-digital converter 24, the sampled video is converted to a parallel digital form once each horizontal period as controlled by the horizontal sync input. It has been found that conversion to 6 bits (theoretically, 64 grey levels) is a satisfactory number, but any number could be utilized in this invention. Conversion to 6 bits, however, has been found to be preferable since fewer bits can result in contouring in the reconstructed picture while a greater number of bits adds complexity to the system.

The output from the analog-to-digital converter 24 is coupled on a plurality of lines (6 lines numbered 26–31 as shown in FIG. 2 where 6 bits are utilized) to the input of buffer storage 34. Buffer storage 34 is made of N L-bit shift registers, where N is the number of outputs from the analog-to-digital converter (6 as shown in FIG. 2) and L is the length of, or number of storage elements in, the shift register (which for American TV can be 256, as indicated in FIG. 2). While random access memories or other types of digital storage units might be utilized, it appears that shift registers provide the simplest implementation and buffer storage 34 is therefor preferably made up of conventional shift registers.

The length L is determined by the number of horizontal scan lines per field in the original video signal (and thus the number of samples per vertical sample line in the sampled video). L should be larger than the number of active (unblanked) scan lines but smaller than the total number of scan lines. Thus, for the American Standard TV system (i.e., a 525 line system), this means that L should be greater than 242 ½ and smaller than 262 ½. Likewise, for the European standard TV system (i.e., a 625 line system), L should be greater than 290 and less than 312 ½.

Writing data into the buffer storage unit and reading data out of the buffer storage unit is accomplished by applying clock pulses from clock switching unit 36 through lead 38 to the shift registers as indicated in FIG. 2. The output from the buffer storage unit is coupled through a plurality of lines (numbered 40–45 for the six bits as indicated in FIG. 2) to a digital-to-analog converter 48, which converter receives a second input from the clock switching unit 36 through lead 50. The output from the digital-to-analog converter is coupled through lead 52 and this output is an analog signal having the same amplitude variations as the input sampled video signal but has its time being stretched out by a factor of D to 1, where D is a preselected sampling rate, which rate is determined by divider 54 connected with the clock switching unit 36 (divider 54 is indicated in FIG. 2 to be a ÷7).

As also indicated in FIG. 2, field identification may be provided for the system by means of field identification unit 56 connected to receive horizontal and vertical sync input signals, with the output from the identification unit being taken through lead 58 to field coding unit 60 which also receives the output from the digital-to-analog converter through lead 52. The output from the field coding unit 60 is a narrow bandwidth output coupled from the system by lead 62.

Operation of the compression system shown in FIG. 2 is best described by reference to the typical waveforms shown in FIG. 3, which waveforms are meant to be illustrative only and the invention is not meant to be limited thereto. After an external start pulse is received (which indicates that the sampling line is being moved across the raster) at the clock switching unit 36, which pulse is received on lead 64 (see FIG. 3B), the switching circuitry 36 is inactive until the next vertical sync pulse occurs, the clock circuitry delays for a period of time less than the vertical blanking period (which may be, for example, a delay of 16 H (H=the horizontal period) as indicated in FIG. 3C) after which the clock switching pulse generates the write gate signal, as indicated in FIG. 3D. The short delay of 16 H as indicated in FIG. 3C and 4D is used to position the 256 sampled elements in time so that they start in blanking and end in blanking.

When the write gate is on, it gates through clock pulses (See FIG. 3F) that are derived from the horizontal sync and occur at the horizontal rate, which is the rate at which the analog-to-digital converter is operating. The switching circuitry counts the number of clock pulses and as soon as 256 pulses have occurred, the write gate is turned off to prevent any further horizontal rate clock pulses from getting through. The buffer storage shift registers are now full and contain, in six bit presentation, the amplitude of 256 sample points from sampled video line number 1.

The switching circuitry now waits for the next vertical sync pulse which would be the sync pulse proceeding sampled line number 3 as shown in FIG. 3A. This leaves a time interval between the write gate and the read gate that provides a blanking interval in the output that can be used for coding the output with regard to interlace as described hereinafter. The details with regard to the relationship of the write gate to the vertical sync and blanking are best shown in FIGS. 4A to 4D. The waveforms shown therein are drawn to the EIA standard RS-170 sync waveform format, but it is to be understood, however, that this technique is meant to be applicable to other standards and formats.

On reception of the vertical sync pulse proceeding line number 3, the switching circuitry generates a read gate signal (see FIG. 3E). This signal gates through a clock which is derived from the horizontal sync signal by dividing the sync signal by a factor D, which as shown in FIG. 2 may be equal to 7 (unit 54 is indicated as a ÷7).

This clock shifts the data out of the shift registers and into the digital-to-analog converter at this new reduced rate (see FIG. 3H). The digital-to-analog converter, which is enabled by the read gate from the clock switching unit 36 through lead 50, converts this digital data back to an analog signal that has the same amplitude characteristic as the input sampled video signal but with its time base stretched out by the factor of D (which is 7 to 1 as shown in FIG. 2, by way of example) — see FIG. 3J. As soon as the 256 clock pulses have been gated through, the read gate goes off and the switching circuitry waits for the arrival of the next vertical sync pulse at which time the write-read sequence is repeated.

The choice of the read clock dividing factor D, affects the operation in several ways. First of all, if an odd number is selected, the timing of the write gate is such that it writes from one field on one occasion and from an interlaced field on the next, sequencing back and forth automatically. This is true of all odd D's satisfying the relationship $$SDH - LDH < SH \tag{1}$$

$$D < \frac{S}{S-L} \tag{2}$$

where $S$ equals the number of scan lines per field, $L$ equals the number of storage elements per shift register, $D$ equals the clock division factor and $H$ equals the horizontal period. By way of example, where $S$ equals 262 ½ and $L$ equals 256, $D$ must be less than 40.

If an even number is chosen for $D$, then the write gate will automatically write from the same relative field on subsequent occasions, bypassing the interlaced field. Choice of one or the other field can be made by appropriate gating of the vertical sync utilizing the field identification signal as shown by the dotted line 63 in FIG. 2. The number $D$ must again meet the requirement of relationship 2 as set forth hereinabove.

The choice of $D$ also affects the amount of bandwidth compression achieved. The sampling process samples the original video at the horizontal rate (the rate is actually very slightly less than the horizontal rate as a result of frame scanning), so the useable bandwidth (highest frequency components containing picture information) sample signal is $$f \max = \tfrac{1}{2} H \tag{3}$$

The present compression system results in a further bandwidth compression by the factor $D$, or $$f \max = \tfrac{1}{2} DH \tag{4}$$

Some typical bandwidths from a 525 line TV system are set forth hereinbelow:

| D | f max (Hz) |
| --- | --- |
| 2 | 3,938 |
| 3 | 2,625 |
| 4 | 1,969 |
| 5 | 1,575 |
| 6 | 1,312 |

| -continued | |
|---|---|
| D | f max (Hz) |
| 7 | 1,125 |
| 8 | 984 |
| 9 | 875 |
| 10 | 788 |
| 11 | 716 |
| 21 | 375 |

The field (odd or even interlace) from which a sample line was taken can be determined by the straightforward field identification circuitry. This type of circuitry ascertains the location of the horizontal sync pulse after the vertical interval (and after equalizing pulses, if present) and thus identifies whether that field has a full or half line immediately after vertical blanking.

This information can then be used to insert the field coding into the blanking interval (the period when it is not enabled through lead 50) of the digital-to-analog converter output.

Field coding can be accomplished by many different means. A simple way would be to add a sync pulse of opposite polarity to that of the video to the narrow bandwidth output signal and modulate its width in accordance with the sync identification. Another technique would be to add single or multiple pulses in the blanking interval. In any event, this coding allows the receiving device to identify the interlace status of the arriving narrow-bandwidth video so that it can be properly assigned or otherwise positioned at the receiver.

Figure 5:
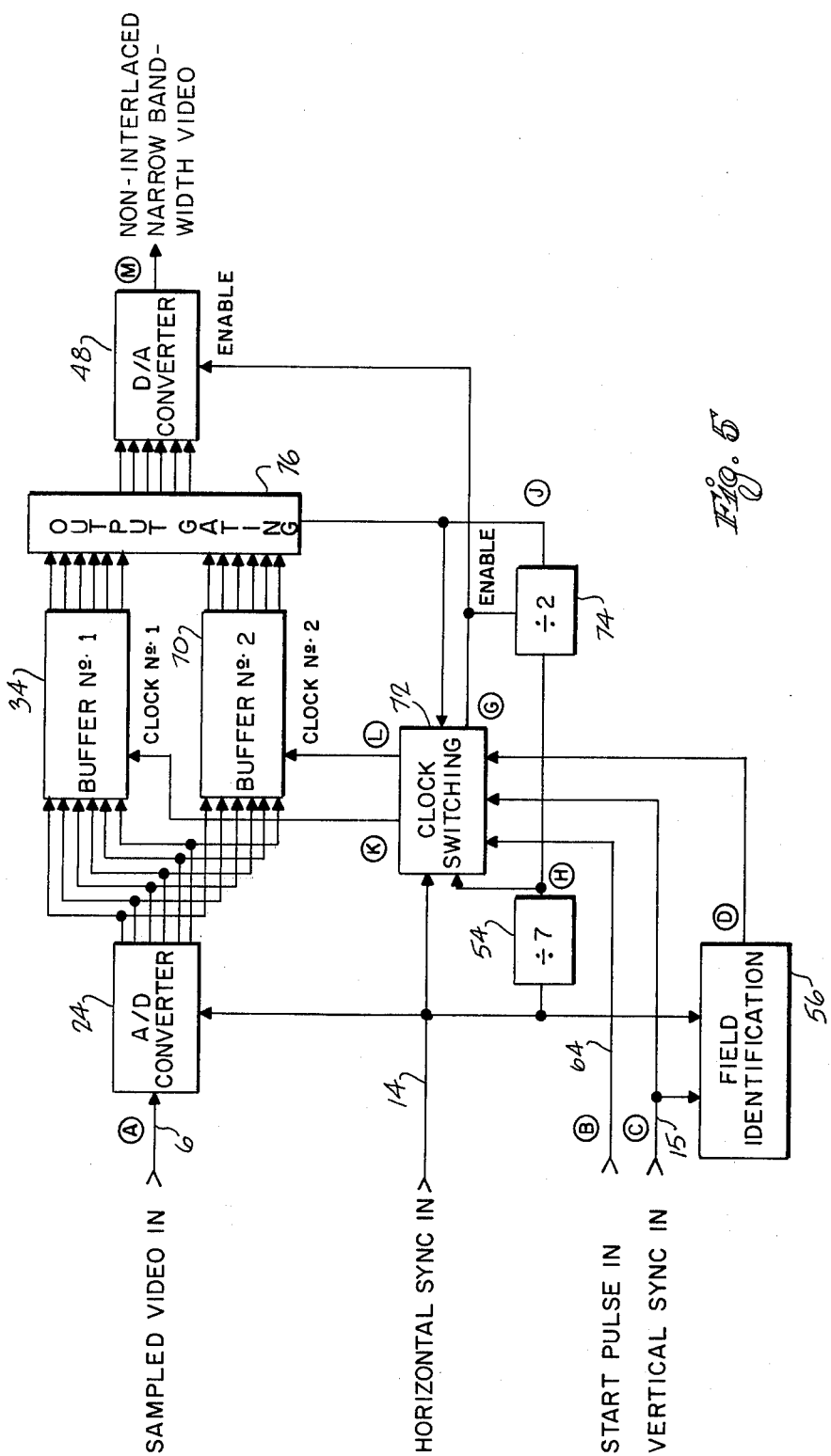
FIG. 5 is a block diagram of an alternate embodiment of this invention utilizing two line buffer storage units which may be used to generate a continuous non-interlaced narrow bandwidth signal from an interlaced real-time video signal.

An alternate embodiment of the system in FIG. 2 is shown in FIG. 5. This embodiment uses the same basic concept (analog-to-digital conversion, digital storage with two-rate clock, and digital-to-analog conversion) but, by the addition of a second buffer storage element, it also provides a non-interlaced bandwidth reduced output signal.

The sampled video (see FIG. 6A) is again coupled to an analog-to-digital converter 24, but the output of the converter is connected to the input terminals of two identical buffer storage units 34 and 70. Writing data into the buffer storage and reading data out of the buffer is accomplished by applying clock pulses from clock switching unit 72 to the two buffers in a proper sequence by use of the clock switching circuitry. Operation of the clock switching circuitry is best understood by reference to the waveform drawings of FIG. 6. Upon reception of the start pulse (see FIG. 6B), the switching circuitry waits for the next vertical sync pulse that precedes an odd field (see FIGS. 6C and 6D), as determined by the field identification circuitry 56, and then generates an odd write gate (see FIG. 6E). This gate gates through to Buffer No. 1 clock pulses that are derived from horizontal sync and occur at the horizontal rate (see FIG. 6K). Buffer No. 1 is thus sequentially filled with data that is representative of the sampled video from an odd-interlace sample line. The switching circuitry counts the number of clock pulses and, as soon as 256 pulses have occurred, turns the odd write gate off, thus inhibiting any further horizontal rate clock pulses from reaching Buffer No. 1.

Similarly, an even write gate is generated during the subsequent even-interlace sample line and it is used to write data from that line into Buffer No. 2 (see FIGS. 6D, 6F and 6L).

At the next vertical sync pulse, a read gate is generated (see FIG. 6G). This gate enables the digital-to-analog converter 48 (which has been inhibited in order to prevent output variations while the writing process was in progress) and enables a divide-by-two counter 74. This counter generates the output gating signal (see FIG. 6J), and its initial state is such that it connects, in the output gating circuits 76, Buffer No. 1 to the digital-to-analog converter inputs. On the next H/7 clock pulse (see FIG. 6H), the output gating signal changes and connects Buffer No. 2 to the digital-to-analog inputs. At the same time, a clock pulse is sent to Buffer No. 1 and the data is shifted along by one bit. This "ping-ponging" continues until each shift register has received 256 clock pulses, at which time the read gate goes off, inhibiting the digital-to-analog converter, and inhibiting any further H/7 clock pulses from reaching either buffer. The result of the above process is an output from the digital-to-analog converter that is an analog representation of the sampled data from two interlaced sampling lines, with adjacent elements from the two fields interpolated between each other to give 256 × 2 = 512 "sample" points in the output signal waveform (see FIG. 6M). The bandwidth of this output is still determined by equation (4) as set forth hereinabove.

Figure 7:
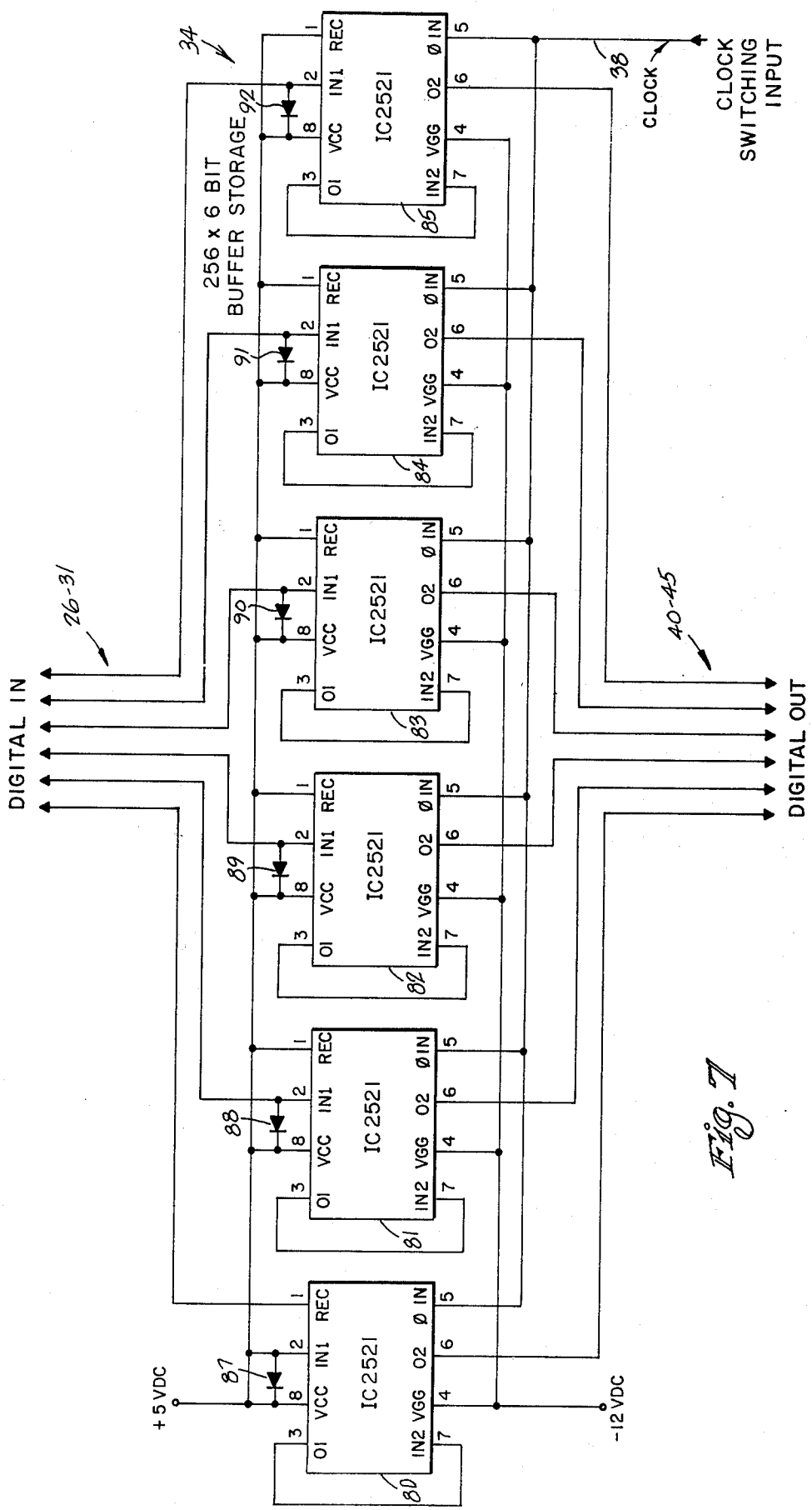
FIG. 7 illustrates in greater detail a buffer storage element that may be utilized with this invention.

Referring again to the embodiment of the invention as shown in FIG. 2, FIG. 7 illustrates a buffer storage element 34 which may be utilized. As shown in FIG. 7, the input to the buffer storage is by means of a plurality of leads 26–31, each of which is coupled to a shift register (six such registers 80–85 are shown in FIG. 7, the shift registers shown are dual 128-bit static shift registers, Type 2521 manufactured by Signetics Corp. of Sunnyvale, California). Each shift register is connected with a −12V DC source of power (not shown) as well as a +5 VDC source of power (not shown), and a plurality of diodes 87–92 are connected between each input line and the +5VDC power line for the purpose of protecting the internal circuitry of the shift register devices. In addition, each shift register receives an output from clock switching unit 36 through lead 38. The digital output from the shift registers in the buffer storage unit is coupled from each shift register through leads 40–45 as shown in FIG. 7.

Figure 8:
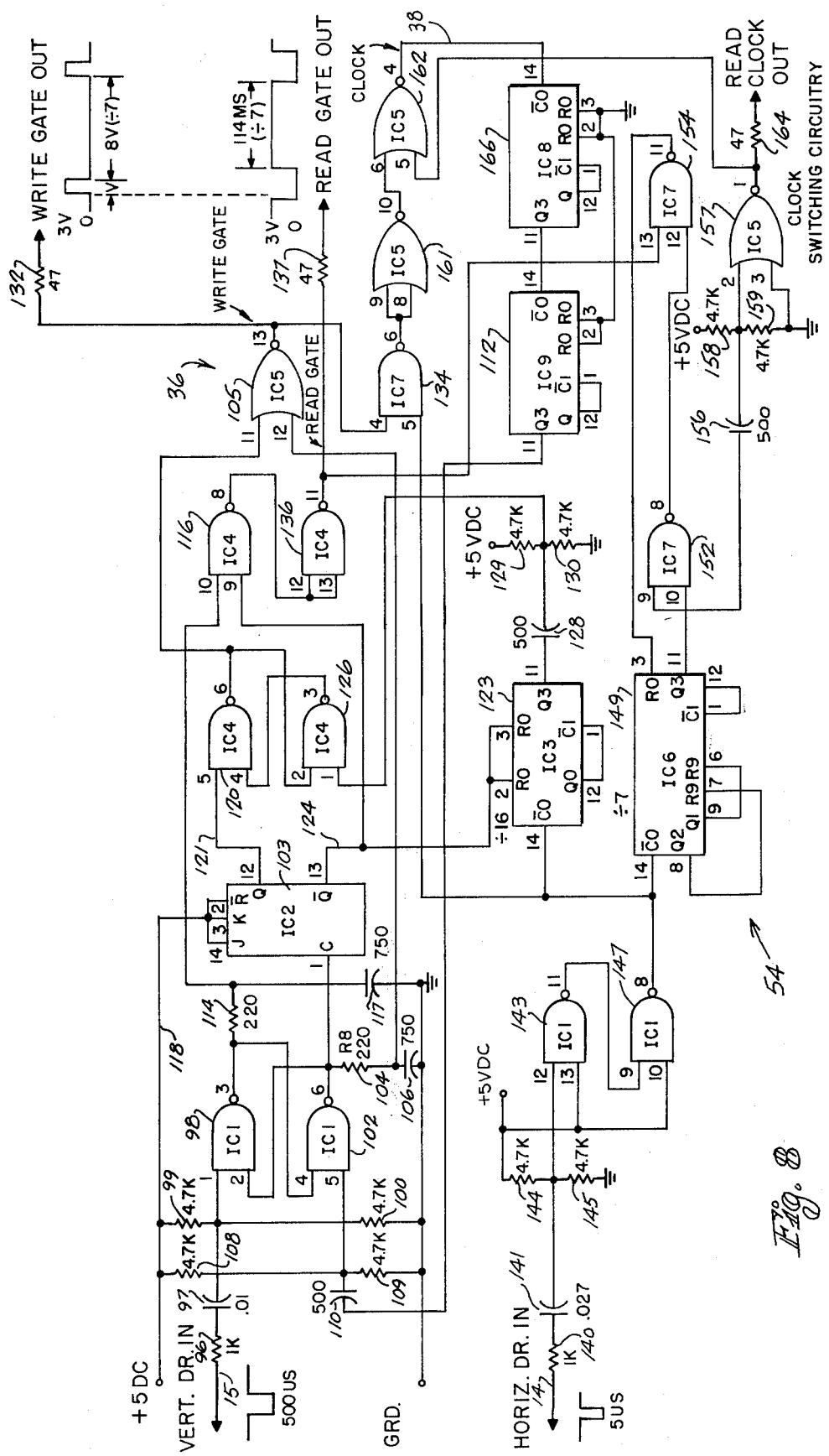
FIG. 8 illustrates in greater detail a clock switching unit and a ÷7 unit that may be utilized with this invention.

The clock switching unit 36 and ÷7 unit shown in FIG. 2 are set forth in greater detail in FIG. 8. As shown in FIG. 8, the vertical sync input coupled through lead 15, resistor 96 and capacitor 97 to NAND gate 98. This input to NAND gate 98 is also connected with a +5VDC power source (not shown) through resistor 99 and to ground through resistor 100.

A second input to NAND gate 98 is supplied from the output of NAND gate 102, which gate is also connected with flip-flop 103, and through resistor 104 to NOR gate 105. A capacitor 106 to ground is connected with one side of resistor 104, as shown in FIG. 8.

The output of NAND gate 98 is directly coupled to one input of NAND gate 102, while the other input to NAND gate 102 is connected with the junction between resistors 108 and 109 of a voltage divider extending between the +5VDC power source (not shown) and ground. The second input to NAND gate 102 is also connected through capacitor 110 to the 4 bit binary counter 112. The output from NAND gate 98 is also coupled through resistor 114 to one input of NAND gate 116 with resistor 114 having one side connected with ground through capacitor 117.

Flip-flop 103 is connected with the +5VDC power source (not shown) through lead 118, to one input of NAND gate 120 through lead 121 and to the second input of NAND gate 116 and the 4 bit binary counter 123 through lead 124. The second input to NAND gate 120 is directly coupled from the output of NAND gate 126 which gate has one input directly coupled from the output of NAND gate 120 and has the other input connected to the 4 bit binary counter 123 to capacitor 128 and to the junction of resistors 129 and 130 extending between the +5VDC power source (not shown) and ground.

The output from NAND gate 120 is also coupled to an input of NOR gate 105, one output of which is the write gate coupled out through resistor 132 and to an input of NAND gate 134. The output from NAND gate 116 is coupled to both inputs of NAND gate 136, the output of which is the read gate coupled out through resistor 137.

The horizontal sync input is coupled to the clock switching unit through lead 14, resistor 140 and capacitor 141. The input is coupled to one input of NAND gate 143, which input is also connected to the junction of resistors 144 and 145 which extend between the +5VDC power source (not shown) and ground. The second input of NAND gate 143 is connected with the +5VDC power source (not shown) as is an input to NAND gate 147, the other input to which is connected the output of NAND gate 143.

The output of NAND gate 147 is coupled to the second input of NAND gate 134 and to the 4 bit binary counter 123. This counter 123 is interconnected to provide a division by 16 between its input $\bar{c}o$ and its output Q3. In addition, this output is also coupled to the decade counter 149 of ÷7 of unit 54, which counter is interconnected to provide a division of seven between its input $\bar{c}o$ and its output Q3. The decade counter 149 is also connected with NAND gate 152, the output of which is connected to one input of NAND gate 154. The second input to NAND gate 154 is coupled from the output from NAND gate 136 and is the read gate output, while the output of NAND gate 154 is connected with the decade counter 149. The decade counter 149 is also connected to the capacitor 156 to a first input of NOR gate 157, the other input of which is returned to ground. In addition, the first input of NOR gate 157 is also connected to the junction of resistors 158 and 159 extending between the +5VDC power supply (not shown) and ground.

The output of NAND gate 134 is coupled to both inputs of NOR gate 161, the output of which is coupled to one input of NOR gate 162. The second input to NOR gate 162 is coupled to the output of NOR gate 157, which output is coupled from the clock switching unit through resistor 164 as a read clock output. The output of NOR gate 162 is the clock switching output signal coupled out on lead 38, which lead is also connected with the 4 bit binary counter 166, which counter is also connected with the 4 bit binary counter 112. Counter 166 and 112 are individually interconnected to provide division by 16 between their inputs and outputs and connected together serially to provide a division of 16 × 16=256 of the clock input rate.

It will be understood that the embodiment shown in FIG. 8 is implemented using transistor-transistor logic. For example, the NAND gates illustrated are type 7400, the flip-flop 103 is a type 7473, the binary counters 112, 123 and 166 are type 7493 the NOR gates are type 7402 and the decade counter 149 is a type 7490.

Figure 9:
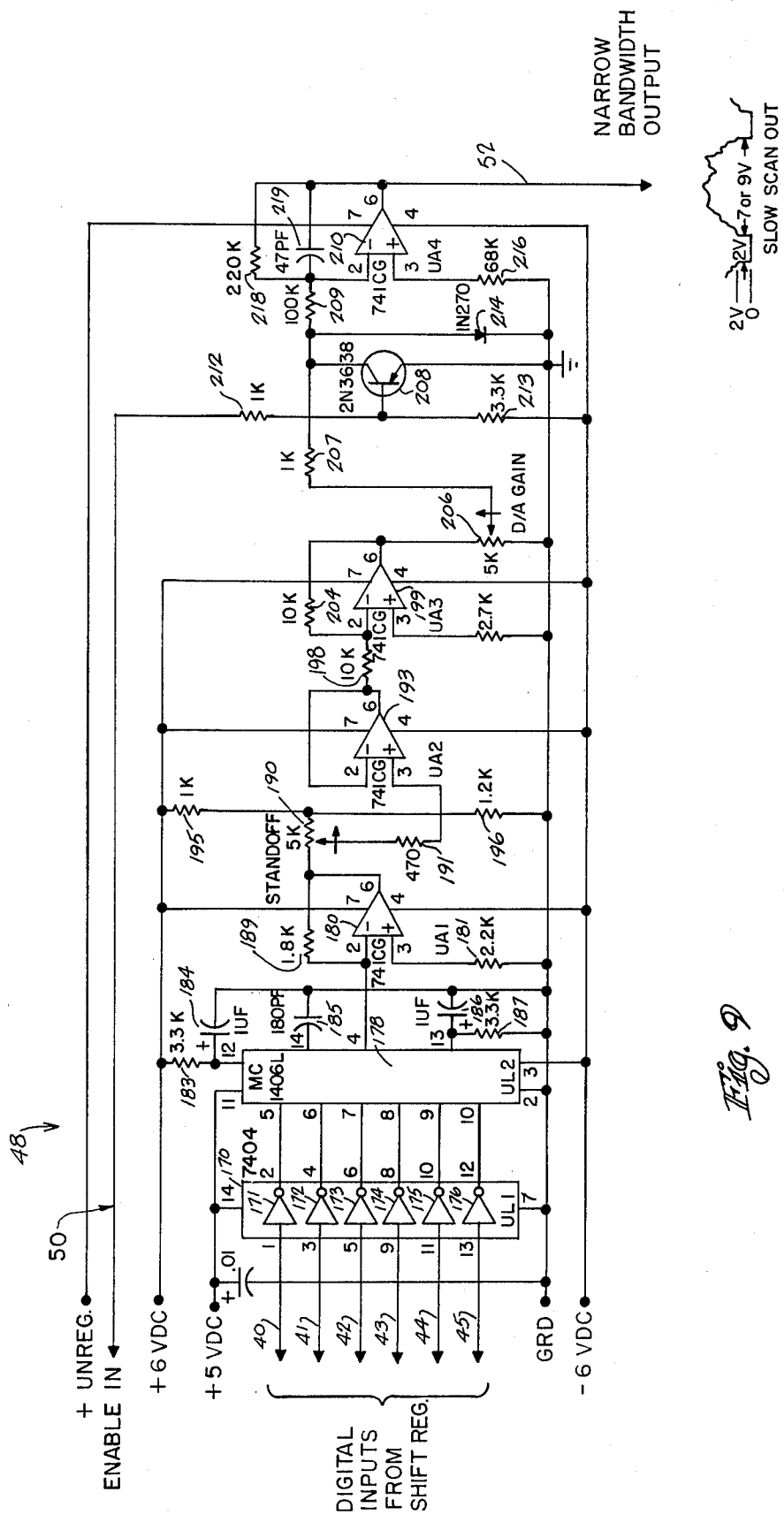
FIG. 9 illustrates in greater detail a digital-to-analog converter that may be utilized with this invention.

The digital-to-analog converter 48 is shown in greater detail in FIG. 9. The digital inputs from the buffer storage unit 34 is coupled to the digital-to-analog converter 48 on leads 40–45 and coupled therein to unit 170 which includes a number of inverters (six as shown in FIG. 9, numbered 171–176). The outputs from inverters 171–176 are coupled to unit 178, which unit is connected with one input of operational amplifier 180. Operational amplifier 180 is also connected with ground through resistor 181 and to the +6VDC and −6VDC power sources (not shown). In like manner, unit 178 is connected with the +5VDC and −6VDC power sources (not shown), as well as being connected to the +6VDC power source through resistor 183 and with ground to capacitors 184, 185 and 186 and through resistor 187.

The output of the operational amplifier 180 is coupled out through resistor 189 and through potentiometer 190 and resistor 191 to one input of the operational amplifier 193. In addition, potentiometer 190 is connected at one end to the junction of resistors 195 and 196 connected between the +6VDC power supply (not shown) and ground.

The output from the operational amplifier 193 is coupled back through resistor 198 to one input of the operational amplifier 199. The output from the operational amplifier 199 is coupled back to the input through resistor 204 and through potentiometer 206 and resistor 207 to the collector of transistor 208 and through resistor 209 to one input of the operational amplifier 210. The transistor 208 has a grounded emitter and has the base connected to the junction of resistors 212 and 213 extending between the externally applied enable input signal and ground. This enable signal is the enable of lead 50 in FIG. 2. In addition, a diode 214 is connected in parallel with transistor 208.

The operational amplifier 210 is connected with ground through resistor 216 and the output is coupled back to one input through resistor 218 and capacitor 219 connected in parallel with one another. The output from the operational amplifier is also a narrow-bandwidth output signal coupled with the circuit on lead 52.

Figure 10:
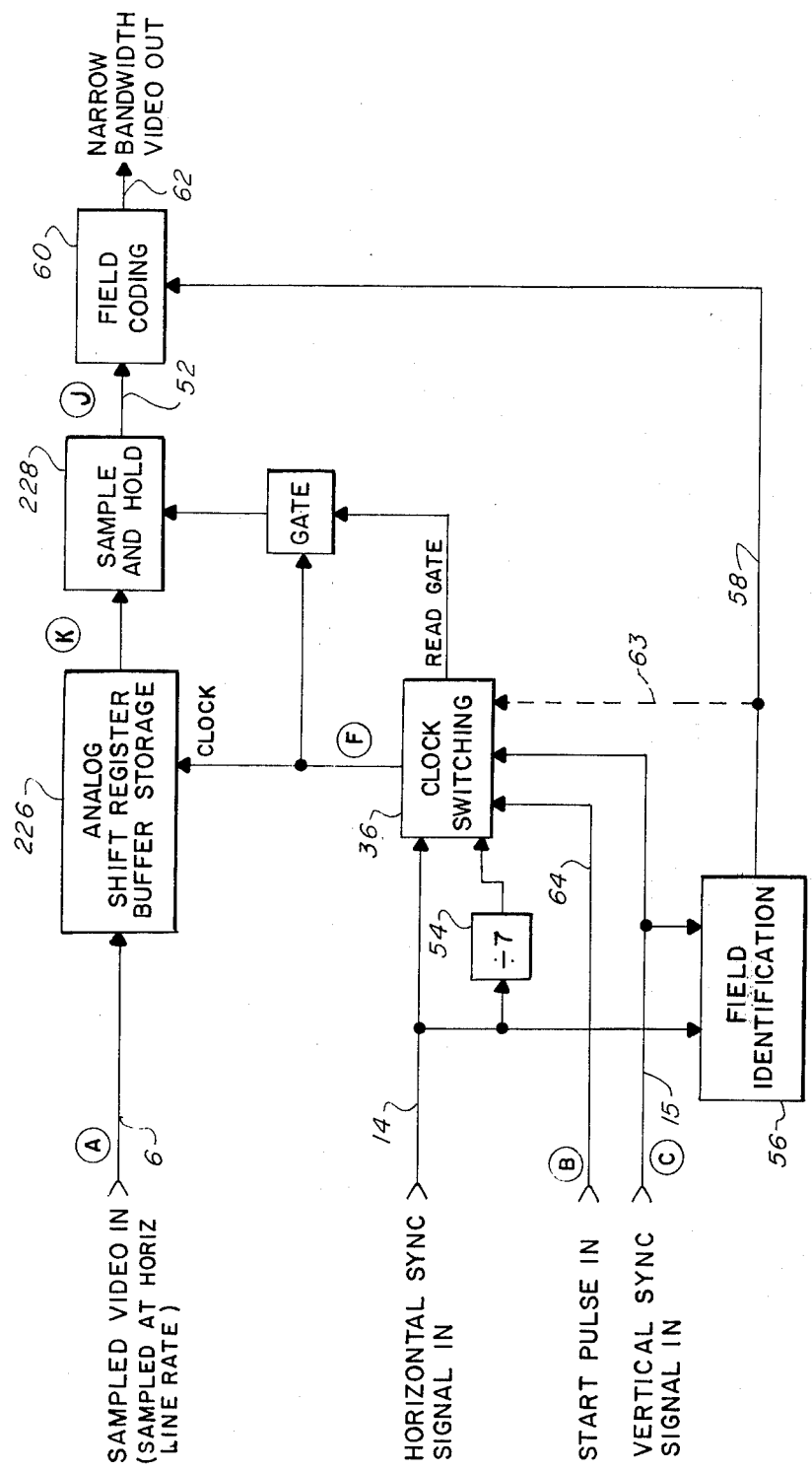
FIG. 10 is a block diagram of an alternate embodiment of the system shown in FIG. 2 that uses an analog shift register as the buffer storage element.

The system of FIG. 2 can also be implemented using an analog shift register, see FIG. 10. Such a shift register was proposed and patented by K. Schlesinger in 1946 (U.S. Pat. No. 2,403,955) but has not been available as a semiconductor device until very recently. These devices store samples of analog signals as charge levels which are clocked along from element to element in response to clock pulses.

In this embodiment, an analog shift register 226 and a sample-and-hold circuit 228 is substituted for the analog-to-digital converter, the digital buffer storage, and the digital-to-analog converter of FIG. 2. The resulting system is shown in FIG. 10. This system uses the same clocking circuitry and the waveforms are shown in FIG. 3A–3F, 3J and 3K except that 3J is the sample and hold output. The sample-and-hold circuit is required since the output from the analog shift register is a return-to-zero type signal (a square wave whose base amplitude is fixed and whose peak amplitude varies in proportion to the analog input signal) as shown in FIG. 3K. The sample-and-hold circuit stretches the pulses to the full 7H period and thus provides a continuous analog output signal.

Figure 6:
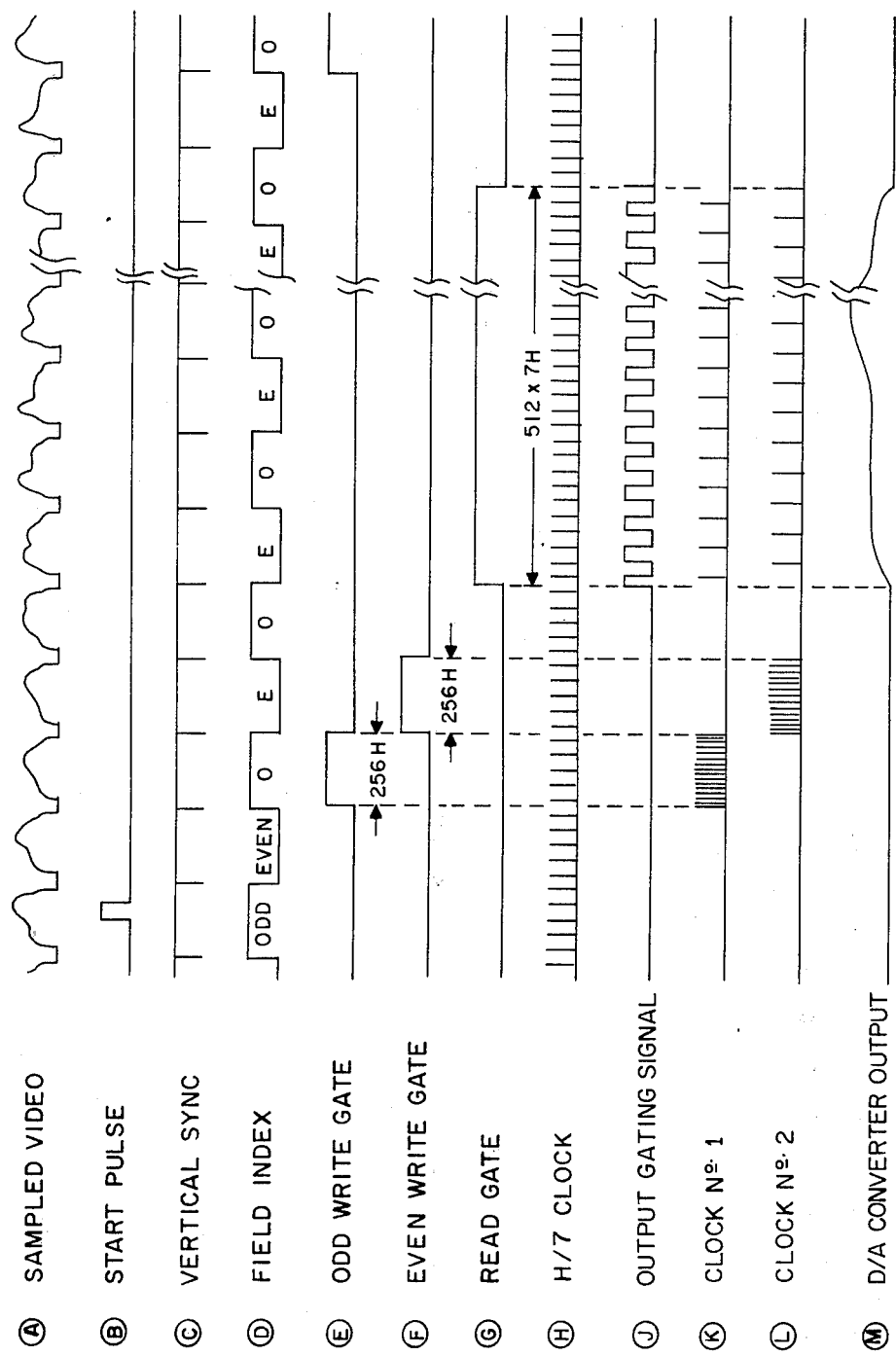
FIG. 6 shows a plurality of typical waveforms illustrating the time relationship established between the various signals found in the system of FIG. 5.
Figure 11:
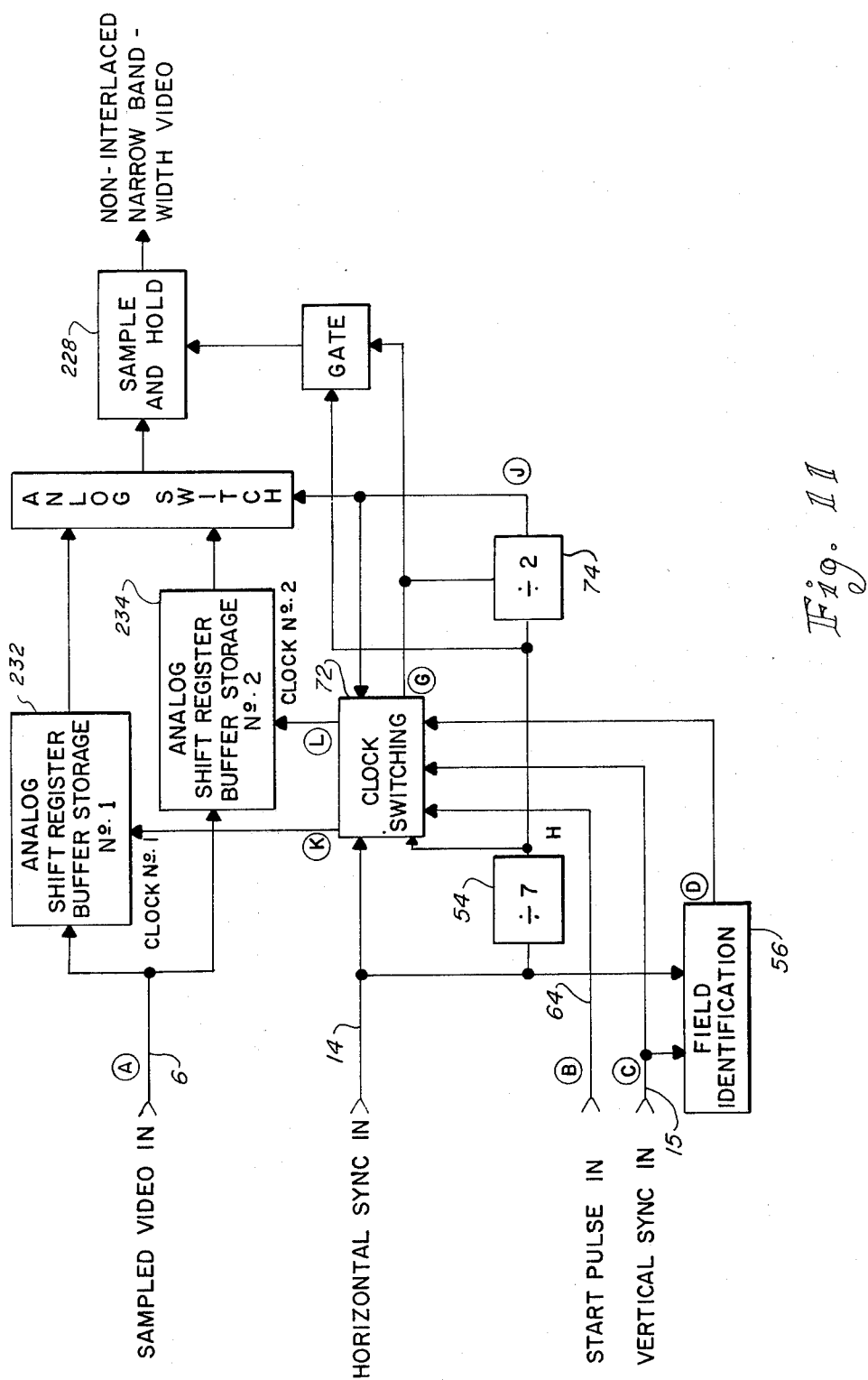
FIG. 11 is a block diagram of an alternate embodiment of the system shown in FIG. 5 using analog shift registers as the buffer storage elements.

FIG. 11 shows an alternate embodiment of the system of FIG. 5 using analog shift registers 232 and 234 as the buffer storage elements. The timing waveforms for this system are the same as shown in FIG. 6 except that M is the sample and hold output rather than the digital-to-analog connector output.

At the present time the preferred embodiment is that shown in FIG. 11.

As can be seen from the foregoing, the bandwidth compression system and method of this invention provides an improved system and method not heretofore available.

We claim:

1. A bandwidth compression system, comprising:
   input means for receiving a sampled signal having a wide bandwidth from one line and succeeding sampled signals from succeeding vertical positions;
   first converter means connected with said input means for producing an output in digital form that is indicative of at least predetermined characteristics of a sampled signal received at said input means;
   storage means connected with said first converter means for receiving the output therefrom and storing the same; and
   second converter means connected with said storage means to receive the output therefrom and responsive thereto producing an output signal in analog form that includes substantially the same predetermined characteristics of said sampled signal but having a relatively narrow bandwidth with respect thereto.

2. The bandwidth compression system of claim 1 wherein said second converter means is a digital-to-analog converter for producing an analog signal having the same amplitude variations as a sampled signal received at said input means but with stretched out time base.

3. The bandwidth compression system of claim 1 wherein said first converter means is an analog-to-digital converter for converting the amplitude of a sampled signal to a binary output signal.

4. The bandwidth compression system of claim 3 wherein said analog-to-digital converter converts the amplitude of each sample element of said received sampled signal to a parallel binary code word having a predetermined number of bits.

5. The bandwidth compression system of claim 1 wherein said storage means is a buffer storage element that includes a plurality of shift registers.

6. The bandwidth compression system of claim 3 wherein said buffer storage element includes a plurality of buffer storage units for permitting storage of the output from said first converter means alternately in said plurality of buffer storage units.

7. The bandwidth compression system of claim 1 wherein said system also includes control means for controlling said storage means and said second converter means so that input information is stored at one rate in said storage means and coupled out of said storage means and converted to analog form at a predetermined reduced rate.

8. The bandwidth compression system of claim 7 wherein said control means includes clock switching means.

9. A bandwidth compression system, comprising:
   input means for receiving a sampled video signal of wide bandwidth from one line and succeeding sampled signals from succeeding vertical positions;
   an analog-to-digital converter connected with said input means, said converter producing a digital output indicative of the amplitude of a sampled video signal received at said input means;
   buffer storage means connected with said analog-to-digital converter to receive the output therefrom and store the same;
   a digital-to-analog converter for receiving the output from said buffer storage means and producing an analog signal based thereon;
   and clock switching means for causing storage of said digital signal at a rate equal to the sampled rate and for controlling the conversion at a reduced rate of said digital signal into an analog signal having substantially the same amplitude variations as a received sampled video signal but having a predetermined narrow bandwidth.

10. The bandwidth compression system of claim 9 wherein said system receives sampled video signals having predetermined fields, and wherein said system includes field identification means connected with said analog-to-digital converter, and field coding means connected with said field identification means and said digital-to-analog converter to provide field identification for produced narrow bandwidth signals.

11. The bandwidth compression system of claim 9 wherein said analog-to-digital converter converts the amplitude of the received video sampled signal into parallel binary code words having a predetermined number of bits, and wherein said clock switching means controls storage of said binary coded words by causing each said word to be sequentially written into said buffer storage means.

12. The bandwidth compression system of claim 11 wherein said system includes means for preselecting the amount of bandwidth reduction.

13. A bandwidth compression system, comprising:
   input means for receiving a sampled video signal of wide bandwidth from one line and succeeding sampled signals from succeeding vertical positions;
   an analog-to-digital converter connected with said input means, said converter producing a digital output indicative of the amplitude of a sampled signal received at said input means;
   first and second buffer storage means connected with said analog-to-digital converter to alternately receive the output therefrom;
   an output gating circuit connected to receive the output from said first and second buffer storage means;
   a digital-to-analog converter for receiving the output from said first and second buffer storage means through said output gating means, said converter producing an analog signal based upon the digital signal received from said first and second buffer storage means;
   and clock switching means connected with said first and second buffer storage means, said output gating means and said digital-to-analog converter causing the sampled amplitude of the signal received at said input means to be converted to a digital signal for storage and for controlling conversion of said digital signal into an analog signal of narrow bandwidth relative to a sampled video signal received at said input means, said output being a non-interlaced output.

14. The bandwidth compression system of claim 13 wherein said system includes a divider circuit connected with said clock switching means and said output and gating means to cause said output coupled to said digital-to-analog converter from said first and second buffer storage means to be coupled thereto alternately.

15. The bandwidth compression system of claim 13 wherein said system receives sampled video signals having predetermined fields, and wherein said system includea a field identification means connected with said analog-to-digital converter and said clock switching means whereby field identification is established.

16. A method for obtaining bandwidth compression, comprising:
receiving a sampled signal having a wide bandwidth from one line and succeeding sampled signals from succeeding vertical positions and producing therefrom a signal in digital form that is indicative of at least predetermined characteristics of the received sampled signal;
storing the signal in digital form;
and converting the stored digital signal into an analog form that includes substantially the same predetermined characteristics as said received sampled signal but having a relatively narrow bandwidth with respect thereto.

17. The method of claim 16 wherein received sampled signals have predetermined fields and wherein the field of the sampled input signal is established and the output of reduced bandwidth is field coded for identification purposes.

18. A method for bandwidth compression, comprising:
receiving a sampled signal of wide bandwidth from one line and succeeding sampled signals from succeeding vertical positions and producing therefrom a digital output signal indicative of the amplitude of the received sampled video signal;
storing the digital signal; and
converting the digital signal to analog form from said storage with said analog signal having substantially the same amplitude variation as does the received sampled video signal but with a narrow bandwidth relative to the received sampled video signal.

19. The method of claim 18 wherein the digital output is stored alternately in first and second buffer means and then alternately clocked out of said buffer means to produce a non-interlaced output.

20. A signal processing system, comprising: input means for receiving a wide bandwidth signal; means for sampling a received wide band video signal from one line and succeeding sampled signals from succeeding vertical positions;
first converter means connected with said input means for producing an output in digital form that is indicative of at least predetermined characteristics of a sampled signal received at said input means;
storage means connected with said first converter means for receiving the output therefrom and storing the same; and
second converter means connected with said storage means to receive the output therefrom and responsive thereto producing an output signal in analog form that includes substantially the same predetermined characteristics of said sampled signal but having a relatively narrow bandwidth with respect thereto.

21. The signal processing system of claim 20 wherein said signal processing means receives a video signal and compresses the same to a narrow bandwidth signal suitable for transmission over relatively inexpensive lines.

22. A signal processign system, comprising:
input means for receiving a wide band video signal with a sampled signal from one line and succeeding sampled signals from succeeding vertical positions;
means for sampling and holding a received wide band video signal;
sync separator means for receiving the wide band video signal;
horizontal and vertical drive recovery means connected with said sync separator means;
an analog-to-digital converter connected with said sampling and holding means, said converter producing a digital output indicative of the amplitude of a sampled video signal received at said input means;
buffer storage means connected with said analog-to-digital converter to receive the output therefrom and store the same;
a digital-to-analog converter for receiving the output from said buffer storage means and producing an analog signal based thereon; and
clock switching means connected to said horizontal and vertical drive recovery means for causing storage of said digital signal at a rate equal to the sampled rate and for controlling the conversion at a reduced rate of said digital signal into an analog signal having substantially the same amplitude variations as the received sampled video signal but having a predetermined narrow bandwidth.

23. A bandwidth compression system, comprising:
input means for receiving a sampled signal having a wide bandwidth from one line and succeeding sampled signals from succeeding vertical positions:
signal processing means connected with said input means for receiving a sampled signal from said input means and processing the same including signal storing; and
control means for controlling said signal processing means so that an output is produced therefrom in analog form that includes substantially the same predetermined characteristics as said sampled signal but having a relatively narrow bandwidth with respect thereto.

24. The bandwidth compression system of claim 23 wherein said control means includes clock switching means for causing storage at a rate equal to the sampled rate and for controlling the output from said signal processing means at a predetermined reduced rate.

25. The bandwidth compression system of claim 23 wherein said signal processing means includes an analog shift register buffer storage means for storing samples of sampled analog signals received from said input means as charge levels under the control of said control means.

26. The bandwidth compression system of claim 25 wherein said signal processing means includes a plurality of analog shift register buffer storage means for permitting storage of said sampled signals from said input means alternately in said plurality of analog shift register buffer storage means.

27. A bandwidth compression system comprising:
input means for receiving a sampled video signal of wide bandwidth from one line and succeeding sampled signals from succeeding vertical positions;

analog shift register buffer storage means connected to receive a sampled video signal received at said input means and store the same;

sample and hold means connected with said analog shift register buffer storage means to receive the output therefrom; and control means connected with said analog shift register buffer storage means and said sample and hold means to cause storage of said received video signal at a rate equal to the sampled rate and for controlling the analog signal output from said sample and hold means at a predetermined reduced rate having substantially the same amplitude characteristics as a received sample video signal having a predetermined narrow bandwidth.

28. The bandwidth compression system of claim 27 further including a second analog shift register buffer storage means and an analog switch, said analog shift register buffer storage means being connected with said sample and hold means through said analog switch.

29. A bandwidth compression system, comprising:

input means for receiving a sampled video signal of wide bandwidth from one line and succeeding sampled signals from succeeding vertical positions;

first and second analog shift register buffer storage means connected with said input means to alternately receive the sample video signal therefrom;

sample and hold means;

an analog switch connected between said first and second analog shift register buffer storage means and said sample and hold means;

clock switching means connected with said first and second analog shift register buffer storage means and said analog switch for causing storage of said received video signal at a rate equal to the input sampled rate and for controlling the analog signal output to said sample and hold means at a predetermined reduced rate having substantially the same amplitude variations as a received sample video signal but having a predetermined narrow bandwidth; and a divider circuit connected with said clock switching means and said analog switch to cause said analog signal coupled to said sample and hold means from said first and second analog shift register buffer storage means through said analog switch to be coupled to said sample and hold means alternately.

* * * * *